United States Patent
Luong et al.

(10) Patent No.: US 10,358,587 B2
(45) Date of Patent: Jul. 23, 2019

(54) SEAL MATERIAL WITH LATENT ADHESIVE PROPERTIES AND A METHOD OF SEALING FUEL CELL COMPONENTS WITH SAME

(71) Applicant: GM Global Technology Operations LLC, Detroit, MI (US)

(72) Inventors: Anita Luong, Ann Arbor, MI (US); Yeh-Hung Lai, Oakland, MI (US); Andrew P. Nowak, Los Angeles, CA (US)

(73) Assignee: GM Global Technology Operations LLC., Detroit, MI (US)

( * ) Notice: Subject to any disclaimer, the term of this patent is extended or adjusted under 35 U.S.C. 154(b) by 408 days.

(21) Appl. No.: 15/019,100

(22) Filed: Feb. 9, 2016

(65) Prior Publication Data
US 2017/0226392 A1    Aug. 10, 2017

(51) Int. Cl.
*H01M 8/0284* (2016.01)
*H01M 8/0286* (2016.01)
(Continued)

(52) U.S. Cl.
CPC ............ *C09J 183/04* (2013.01); *C09J 5/06* (2013.01); *H01M 8/0263* (2013.01);
(Continued)

(58) Field of Classification Search
CPC .. C09J 183/04; H01M 8/0284; H01M 8/0286; H01M 8/1004
See application file for complete search history.

(56) References Cited

U.S. PATENT DOCUMENTS 6,447,922 B1 *  9/2002  Stein ................ C07F 7/1836
                                                428/447
2002/0082339 A1 *  6/2002  Zhou ................ C09D 11/03
                                                524/588
(Continued)

FOREIGN PATENT DOCUMENTS

WO        2012092142 A1    7/2012

*Primary Examiner* — Jonathan G Jelsma
(74) *Attorney, Agent, or Firm* — Quinn IP Law (57) ABSTRACT

A composition with latent adhesion, fuel cell stack with a bipolar plate assembly with latent adhesion and a method of assembling a fuel cell stack with a seal that has latent adhesion such that reactant or coolant leakage through the seal is reduced. Bipolar plates within the stack include reactant channels and coolant channels that are fluidly coupled to inlet and outlet flowpaths, all of which are formed within a coolant-engaging or reactant-engaging surface of the plate. One or more thin or low aspect-ratio seals are formed on a metal bead that is integrally formed on a surface of the plate and is used to help reduce leakage by maintaining fluid isolation of the reactants and coolant as they flow through their respective channels and flowpaths that are defined between adjacently placed plates. By proper formulation of the precursor materials that make up the seal, the activation of the adhesive bond formed between the seal and an adjacent surface within the fuel cell can be delayed to allow ample time to aligned and compressively join the cell assemblies in a stack housing. This in turn improves the ability of the seal and its adjacent surface to avoid seal damage and concomitant reactant or coolant leakage.

17 Claims, 5 Drawing Sheets

(51) Int. Cl.
*C09J 183/04* (2006.01)
*H01M 8/1004* (2016.01)
*H01M 8/0263* (2016.01)
*H01M 8/1023* (2016.01)
*H01M 8/1039* (2016.01)
*H01M 8/241* (2016.01)
*H01M 8/2475* (2016.01)
*C09J 5/06* (2006.01)
*H01M 8/2404* (2016.01)
*H01M 8/1018* (2016.01)

(52) U.S. Cl.
CPC ....... *H01M 8/0284* (2013.01); *H01M 8/0286* (2013.01); *H01M 8/1004* (2013.01); *H01M 8/1023* (2013.01); *H01M 8/1039* (2013.01); *H01M 8/241* (2013.01); *H01M 8/2475* (2013.01); *C09J 2203/33* (2013.01); *C09J 2400/10* (2013.01); *C09J 2483/00* (2013.01); *H01M 8/2404* (2016.02); *H01M 2008/1095* (2013.01); *H01M 2250/20* (2013.01)

(56) References Cited

U.S. PATENT DOCUMENTS

| | | | |
|---|---|---|---|
| 2006/0074163 A1* | 4/2006 | Tye | C08K 5/0091 524/413 |
| 2006/0105221 A1* | 5/2006 | Scherer | H01M 8/028 429/483 |
| 2009/0197147 A1* | 8/2009 | Fly | H01M 8/0276 429/509 |
| 2010/0221638 A1* | 9/2010 | Terada | C09J 183/12 429/483 |
| 2014/0242323 A1* | 8/2014 | Giorgini | C08G 18/10 428/76 |
| 2014/0346556 A1* | 11/2014 | Ko | C08G 77/04 257/100 |

* cited by examiner

SEAL MATERIAL WITH LATENT ADHESIVE PROPERTIES AND A METHOD OF SEALING FUEL CELL COMPONENTS WITH SAME

BACKGROUND OF THE INVENTION

The present invention relates generally to a composition and method for improved reactant and coolant flow sealing within joined or fluidly cooperating fluid-delivery plates used in a fuel cell assembly, and more particularly to the use of a seal with latent adhesive properties to allow for the assembly of fuel cells where significant adhesion between joined components takes place only after the component assembly process is substantially complete.

Fuel cells convert a fuel into usable electricity via electrochemical reaction. A significant benefit to such an energy-producing means is that it is achieved without reliance upon combustion as an intermediate step. As such, fuel cells have several environmental advantages over internal combustion engines (ICEs) for propulsion and related motive applications. In a typical fuel cell—such as a proton exchange membrane or polymer electrolyte membrane (in either event, PEM) fuel cell—a pair of catalyzed electrodes are separated by an ion-transmissive medium (such as Nafion™) in what is commonly referred to as a membrane electrode assembly (MEA). The electrochemical reaction occurs when a first reactant in the form of a gaseous reducing agent (such as hydrogen, $H_2$) is introduced to and ionized at the anode and then made to pass through the ion-transmissive medium such that it combines with a second reactant in the form of a gaseous oxidizing agent (such as oxygen, $O_2$) that has been introduced through the other electrode (the cathode); this combination of reactants form water as a byproduct. The electrons that were liberated in the ionization of the first reactant proceed in the form of direct current (DC) to the cathode via external circuit that typically includes a load (such as an electric motor, as well as various pumps, valves, compressors or other fluid delivery components) where useful work may be performed. The power generation produced by this flow of DC electricity can be increased by combining numerous such cells into a larger current-producing assembly. In one such construction, the fuel cells are connected along a common stacking dimension—much like a deck of cards—to form a fuel cell stack.

In such a stack, adjacent MEAs are separated from one another by a series of reactant flow channels, typically in the form of a gas impermeable bipolar plate that—in addition to promoting the conveyance of reactants, coolant and byproducts—provides structural support for the MEA, as well as electrical current collection or conveyance. In one common form, the channels are of a generally serpentine layout that covers the majority of the opposing generally planar surfaces of each plate. The juxtaposition of the plate and MEA promotes reactant flow to or from the fuel cell, while additional channels (that are fluidly decoupled from the reactant channels) may also be used for coolant delivery. In one configuration, the bipolar plate is itself an assembly formed by securing a pair of thin metal sheets (called half-plates) that have the channels stamped or otherwise integrally formed on their surfaces. The various reactant and coolant flowpaths formed by the channels on each side typically convene at a manifold (also referred to herein as a manifold region or manifold area) defined on one or more opposing edges of the plate. Examples of all of these features—as well as a typical construction of such bipolar plate assemblies that may be used in PEM fuel cells—are shown and described in commonly owned U.S. Pat. Nos. 5,776,624 and 8,679,697 the contents of which are hereby incorporated by reference in their entirety.

It is important to avoid leakage and related fluid crosstalk within a PEM fuel cell stack. To overcome such leakage, the Assignee of the present invention has applied a relatively thick elastomeric seal (in the form of a gasket) onto discrete portions of the relatively planar surface of the bipolar plate. While useful in establishing the requisite degree of sealing, the thick nature of the sealants makes such an approach unfeasible in actual fuel cell stacks that are made up of more than one hundred bipolar plate and MEA assemblies, as volumetric concerns—especially in the confined spaces of an automobile engine compartment—become paramount. Moreover, the difficulty of ensuring a consistent, repeatable placement of the seal makes this approach cost-prohibitive.

In an alternate to using thick elastomeric seals, the Assignee of the present invention has developed integrally formed bipolar plate sealing where stampings formed in the plate surfaces in a manner generally similar to those used to form the reactant and coolant channels produce gasket-like outward-projecting metal beads to establish discrete contact points between adjacent plate surfaces. An example of using a metal bead to promote such sealing may be found in commonly owned U.S. Pat. No. 7,186,476 the contents of which are hereby incorporated by reference in their entirety. These beads (which may be formed to define a cross sectional rectangular, trapezoidal, semi-spherical or other related shape) are more compatible with high-volume production than that of the thick elastomeric sealant mentioned above. To promote even better sealing, the Assignee of the present invention is pursuing the use of thin elastomeric seals (also referred to herein as microseals) that permit relatively prompt curing of the seals with latent adhesion properties such that robust adhesive bonding is delayed until such time as the various individual fuel cells of a fuel cell stack can be aligned and compressing within the stack housing; this is disclosed in co-pending U.S. patent application Ser. No. 15/019,152, filed Feb. 9, 2016, entitled ROBUST FUEL CELL STACK SEALING MATERIALS AND METHODS USING THIN ELASTOMERIC SEALS the contents are incorporated herein by reference in their entirety. In another attempt to promote better sealing, the Assignee of the present invention is pursuing the use of microseals where one or more design parameters (such as Poisson's Ratio, aspect ratio and surface frictional or adhesive properties) associated with the microseal can be used to impart an effective stiffness that it exhibits decreased dependence on plate-to-plate misalignment relative to conventional seals; this is disclosed in co-pending U.S. patent application Ser. No. 15/019,128, filed Feb. 9, 2016, entitled ROBUST FUEL CELL STACK SEALING DESIGNS USING THIN ELASTOMERIC SEALS.

What is needed is a material that is tailored to the needs of these improved microseals to facilitate improved fuel cell stack assembly as well as post-assembly stack sealing efficacy and reliability.

SUMMARY OF THE INVENTION

The present inventors have discovered that a proper selection of precursor materials and processing conditions can result in the formation of seals with desirable prompt curing and delayed adhesion properties not found in conventional (i.e., commercially available) seal materials. While the present inventors have found that this combination of prompt curing and latent adhesion is valuable for any fabrication process where prompt adhesion could have adverse consequences for a finished assembly, they have determined that it is especially useful for providing a composition that may be used to provide improved sealing to fuel cell stack assembly where a need to prevent reactant or coolant leakage between adjacently stacked bipolar plates is an important factor in optimum cell operability. In the present context, such a composition displays latent adhesion properties when the activation needed to effect significant adhesive bond formation between the composition and one or more joined articles (such as a fuel cell bipolar plate, as will be discussed in more detail below) takes place at a significant time subsequent to the placement of the composition on the article. For example, a post-assembly operational environment of a component employing such composition may provide such delayed or latent adhesion for the composition as a result of one or more of humidity and temperature conditions present in such environment. A so-called "break-in" period for fuel cells could be one such environment where latent adhesion may be beneficially employed as a way to avoid the undesirable effects of rapid adhesion that may be attendant to conventional fuel cell assembly and processing conditions. Furthermore within the present context, the curing of the bulk seal material and activation of adhesion at the interfaces should be understood as two separate steps where the curing corresponds to the use of heat or a related agent to facilitate crosslinking within the microseal polymer network as a way to produce the desired structure, while the activation of adhesion is to create a substantially permanent chemical bonding between the microseal material and the substrate (specifically, either or both of the metal bead and subgasket) to which it is attached.

According to an aspect of the present invention, a composition includes a silicone precursor, a catalyst, an inhibitor for controlling cure kinetics and a delayed (i.e., latent) adhesion promoter, whereupon mixing the various parts, the composition cures within a first time period and develops a substantial majority of its adhesive strength only after a second time period that is longer than the first time period. The composition also preferably includes a structural reinforcement component.

According to another aspect of the present invention, a method of sealing a stack of fuel cell components is disclosed. The method includes depositing a seal precursor material that comprises a curable resin on one or more component surfaces, thermally curing the precursor material such that a seal is formed, aligning the components along a stacking axis and compressing the aligned components along the stacking axis such that the seal defines an interface between adjacently facing ones of the aligned components. Unlike quick-adhesion materials, the latent adhesion formation of the material that makes up the seal delays the formation of at least a majority of its adhesive interfacial bond until after the aligning and the compressing of the various fuel cells into the stack are achieved. Because of the prompt cure/delayed adhesion, the seal becomes temporarily bonded or tacked—such as through relatively weak van der Waals forces or the like—to the relevant surface (i.e., subgasket, metal bead engaging portion, MEA or a second cured microseal). By way of analogy, the degree of adhesion exhibited by the seal during the curing stage is similar to that of a modest pressure sensitive adhesive (such as Scotch™ Tape, with a strength of about 1-2 N/cm$^2$), while the more permanent degree of adhesion occurs later in the fuel cell stacking forming process. Such post hoc adhesive activation between the seals and their adjacent substrate has the effect of permitting the seals to be more thoroughly and evenly distributed within the final stack, as well as avoid Poisson's effects that would otherwise arise in situations where the adhesion would cause relatively fixed boundary conditions. Relatedly, this helps avoid a premature adhesive bond that would otherwise create large interfacial stresses upon compression of the stack and microseal that could lead to potential seal failure. In addition, it helps make the sealing pressure insensitive to any subsequent loss in adhesion that may take place over the operating life of the stack.

These and other aspects or embodiments will become apparent to those of ordinary skill in the art from a reading of the following detailed description and the appended claims.

BRIEF DESCRIPTION OF THE DRAWINGS

The following detailed description of the preferred embodiments of the present invention can be best understood when read in conjunction with the following drawings, where like structure is indicated with like reference numerals and in which the various components of the drawings are not necessarily illustrated to scale.

DETAILED DESCRIPTION OF THE EMBODIMENTS

Figure 1:
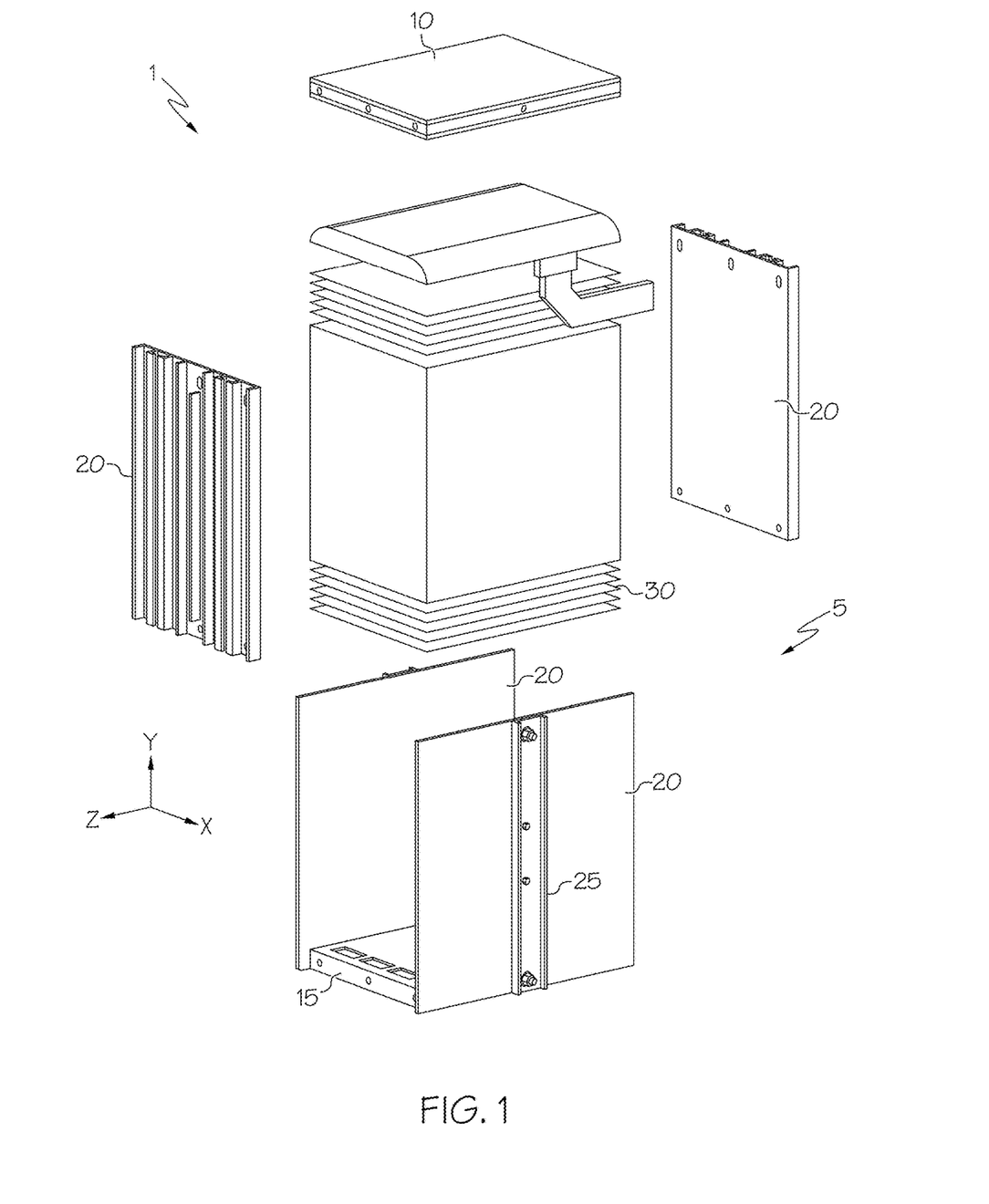
FIG. 1 depicts a schematic exploded view of a fuel cell stack that can be assembled according to an aspect of the present invention.
Figure 2:
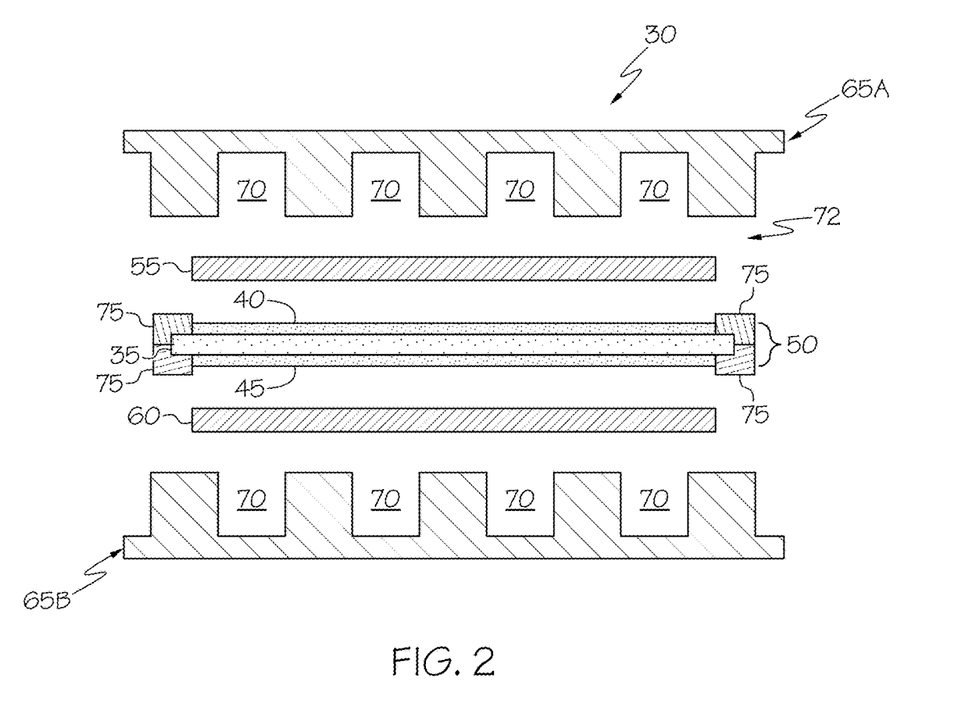
FIG. 2 is a simplified illustration of a partially exploded, sectional view of a portion of a fuel cell with surrounding bipolar plates.
Figure 3:
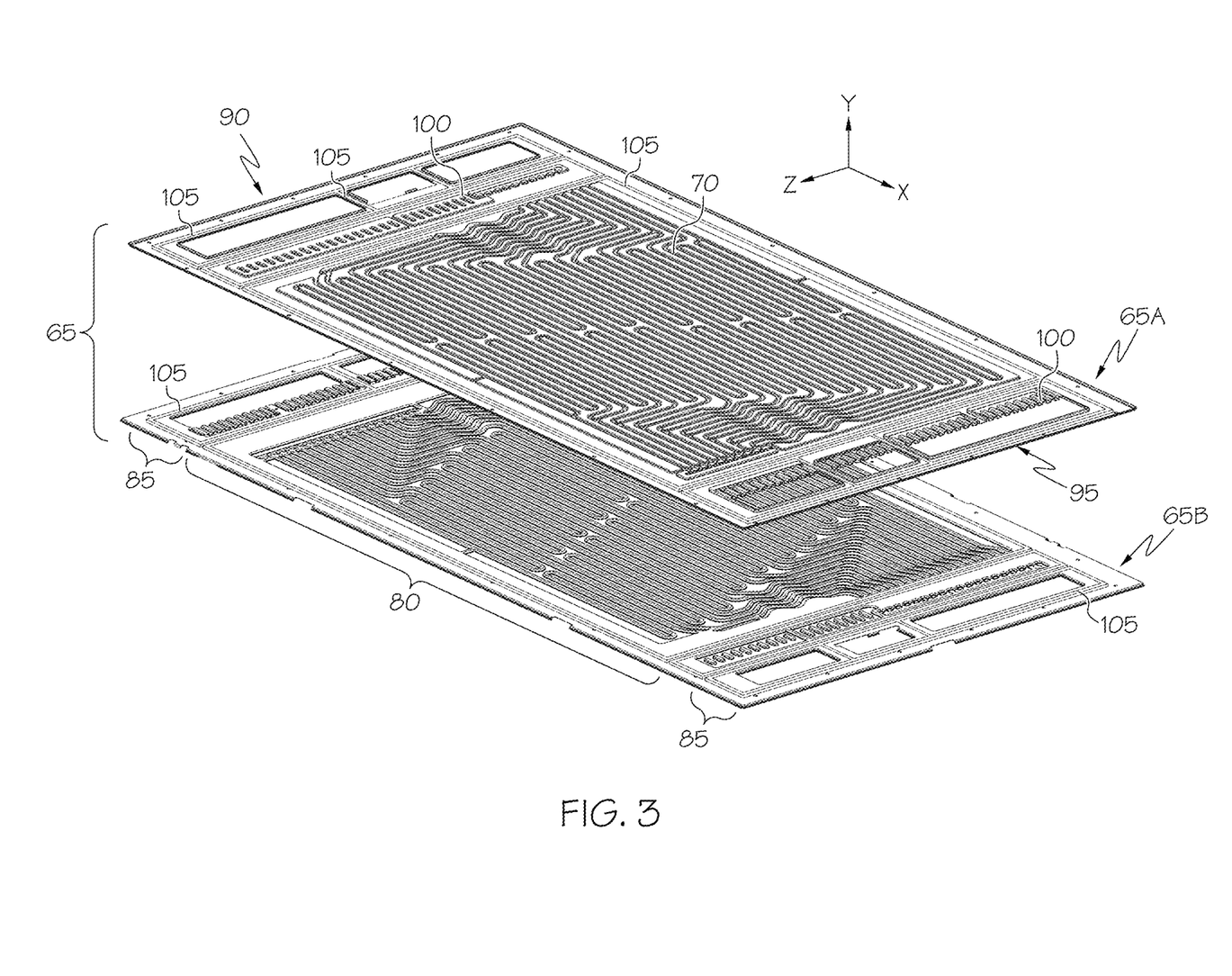
FIG. 3 is a top detailed view of a bipolar plate from FIG. 2 that includes a metal bead that can accommodate a microseal according to an aspect of the present invention.

Referring initially to FIGS. 1 through 3, a simplified view of fuel cell stack 1 in exploded form (FIG. 1), a PEM fuel cell 30 (FIG. 2) and a bipolar plate assembly 65 (FIG. 3) are shown. The stack 1 includes a housing 5 made up of a dry end unit plate 10 and a wet end unit plate 15; these (as well as others, not shown) may help perform the compressive clamping action of the compression retention system of the housing 5; such compression retention system includes numerous bolts (not shown) that extend through the thickness of the stack 1, as well as various side panels 20 and rigid bracketing elements 25 disposed vertically along the stacking direction (the Y axis) for securing the wet end unit plate 15 to the dry end unit plate 10. Stacks of numerous fuel cells 30 are securely held in a compressive relationship along the stacking direction by the action of the bolts, bracketing elements 25 and other components within housing 5. Thus, in the present context, while the stacking axis of the fuel cells 30 may be along a substantially vertical (i.e., Y) Cartesian axis, the majority of the generally planar surfaces of each of the fuel cells 30 resides in the X-Z plane. Regardless, it will be appreciated by those skilled in the art that the particular orientation of the cells 30 within the stack 1 isn't critical, but rather provides a convenient way to visualize the landscape that is formed on the surfaces of the individual plates that are discussed in more detail below. In one non-limiting form, the operating temperature of each fuel cell 30 within stack 1 is between about 50° C. and 110° C. (and more typically between about 60° C. and 100° C.) at the coolant or gas outlets, while the operating relative humidity is typically above 30% (and more typically above 60%) at the gas inlets and the operating current density is above 0.02 A/cm$^2$ and more typically above 0.6 A/cm$^2$.

Referring with particularity to FIGS. 2 and 3, the fuel cell 30 includes a substantially planar proton exchange membrane 35, anode catalyst layer 40 in facing contact with one face of the proton exchange membrane 35, and cathode catalyst layer 45 in facing contact with the other face. Collectively, the proton exchange membrane 35 and catalyst layers 40 and 45 are referred to as the MEA 50. An anode diffusion layer 55 is arranged in facing contact with the anode catalyst layer 40, while a cathode diffusion layer 60 is arranged in facing contact with the cathode catalyst layer 45. Each of diffusion layers 55 and 60 are made with a generally porous construction to facilitate the passage of gaseous reactants to the catalyst layers 40 and 45. Collectively, anode catalyst layer 40 and cathode catalyst layer 45 are referred to as electrodes, and can be formed as separate distinct layers as shown, or in the alternate (as mentioned above), as embedded at least partially in diffusion layers 55 or 60 respectively, as well as embedded partially in opposite faces of the proton exchange membrane 35.

In addition to providing a substantially porous flowpath for reactant gases to reach the appropriate side of the proton exchange membrane 35, the diffusion layers 55 and 60 provide electrical contact between the electrode catalyst layers 40, 45 and a bipolar plate assembly 65 that in turn acts as a current collector. Moreover, by its generally porous nature, the diffusion layers 55 and 60 also form a conduit for removal of product gases generated at the catalyst layers 40, 45. Furthermore, the cathode diffusion layer 60 generates significant quantities of water vapor in the cathode diffusion layer. Such feature is important for helping to keep the proton exchange membrane 35 hydrated. Water permeation in the diffusion layers can be adjusted through the introduction of small quantities of polytetrafluoroethylene (PTFE) or related material.

Although shown notionally as having a thick-walled structure in FIG. 2, the individual plates 65A and 65B (also referred to herein as half-plates) that make up the assembly 65 preferably employ thin sheet-like or foil-like structure (as will be shown and described in more detail below in conjunction with FIG. 3); as such, FIG. 2 should not be used to infer the relative assembly 65 thickness. Simplified opposing surfaces defined by the adjacent half-plates 65A and 65B are provided to separate each MEA 50 and accompanying diffusion layers 55, 60 from adjacent MEAs and layers (neither of which are shown) in the stack 1. One half-plate 65A engages the anode diffusion layer 55 while a second half-plate 65B engages the cathode diffusion layer 60. The two thin, facing metal sheets that make up the half-plates 65A, 65B define—upon suitable compression and related joining techniques—the plate assembly 65. Each half-plate 65A and 65B (which upon assembly as a unitary whole would make up the bipolar plate 65) defines numerous reactant gas flow channels 70 along a respective plate face. Although bipolar plate 65 is shown (for stylized purposes) defining purely rectangular reactant gas flow channels 70 and surrounding structure, it will be appreciated by those skilled in the art that a more accurate (and preferable) embodiment will employ generally serpentine-shaped channels 70. The tops of the channels define lands 72 that act as engaging surfaces with complementary-shaped lands 72 of facing plates.

In operation, a first gaseous reactant, such as $H_2$, is delivered to the anode side of the MEA 50 through the channels 70 from half-plate 65A, while a second gaseous reactant, such as $O_2$ (typically in the form of air) is delivered to the cathode side of the MEA 50 through the channels 70 from half-plate 65B. Catalytic reactions occur at the anode 40 and the cathode 45 respectively, producing protons that migrate through the proton exchange membrane 35 and electrons that result in an electric current that may be transmitted through the diffusion layers 55 and 60 and bipolar plate 65 by virtue of contact between it and the layers 55 and 60. Related channels (not shown) may be used to convey coolant to help control temperatures produced by the fuel cell 1. In situations where the half-plates 65A, 65B are configured for the flow of coolant, their comparable features to their reactant-conveying plate counterparts are of similar construction and will not be discussed in further detail herein.

There are at least two locations within fuel cell 30 where improved sealing of reactant and coolant fluids may be achieved: subgaskets 75 (as shown in FIG. 2) and metal beads 105 (as shown in FIG. 3). Subgaskets 75 (a portion of which is shown in cutaway view in FIG. 2) may be made from a non-conductive and gas impermeable material (such as plastic) that is attached at the perimeter of the MEA 50 to separate the various electronically conductive layers (such as electrode 40 and gas diffusion layer 55 on the anode side and the electrode 45 and gas diffusion layer 60 on the cathode side). Another key function of the subgasket 75 is to prevent the crossover leak and related mixing of reactants around the edge of MEA 50. As such, and in one form, subgasket 75 defines a generally planar frame-like member that is placed peripherally to protect the edge of the MEA 50. In such a configuration, the subgasket 75 is preferably placed where the elastomeric seal of the present invention comes into contact with either the MEA 50 or the facing surface of one or more metal beads that are formed on the bipolar plate 65 (and discussed below in more detail). This helps reduce overboard leaks of reactant gases and coolant, as well as their inter-mixing at the manifold area 85. In one preferred embodiment, subgaskets 75 are between about 50 µm and 250 µm in thickness.

Referring with particularity to FIG. 3, an exploded view showing two adjacently stacked half-plates 65A, 65B to form the bipolar plate assembly is shown in more detail. In particular, the individual half-plates 65A, 65B each include both an active area 80 and a manifold area 85, where the former establishes a planar facing relationship with the electrochemically active area that corresponds to the MEA 50 and diffusion layers 55 and 60 and the latter corresponds an edge (as shown) or peripheral (not shown) area where apertures formed through the plates 65A, 65B may act as conduit for the delivery and removal of the reactants, coolant or byproducts to the stacked fuel cells 30. As can be seen from the exploded view of FIG. 3, these two half-plates 65A, 65B may be used to form a sandwich-like structure with the MEA 50 and anode and cathode diffusion layers 55, 60 and then repeated as often as necessary to form the fuel cell stack 1. In one form, one or both of the anode half-plate 65A and cathode half-plate 65B are made from a corrosion-resistant material (such as 304L SS or the like). The generally serpentine gas flow channels 70 form a tortuous path from near one edge 90 that is adjacent one manifold area 85 to near the opposite edge 95 that is adjacent the opposing manifold area 85. As can be seen, the reactant (in the case of a plate 65A, 65B placed in facing relationship with the MEA 50) or coolant (in the case of a plate 65A placed in facing relationship with the back of another plate 65B where coolant channels are formed) is supplied to channels 70 from a series of repeating gates or grooves that form a header 100 that lies between the active area 80 and the manifold area 85 of one (for example, supply) edge 90; a similar configuration is present on the opposite (for example, exhaust) edge 95. In an alternate embodiment (not shown), the supply and exhaust manifold areas can lie adjacent the same edge (i.e., either 90 or 95). In situations where the individual plates 65A, 65B are made from a formable material (such as the aforementioned stainless steel) the various surface features (including the grooves, channels, lands or the like) are preferably stamped through well-known techniques, thereby ensuring that both the channels 70, lands 72 and their respective structure, in addition to the metal beads (which will be discussed in more detail below) are integrally formed out of a single sheet of material.

Figure 4:
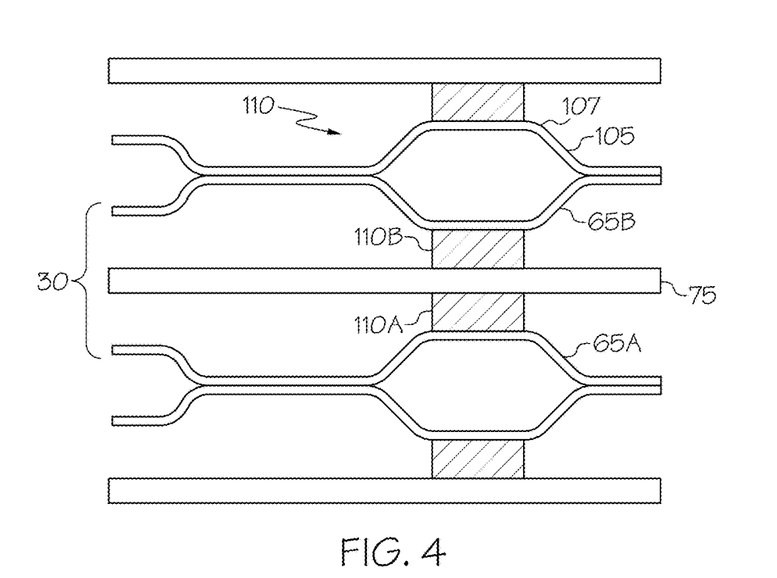
FIG. 4 shows a simplified cross-sectional view indicating the placement of a metal bead, seal and optional subgasket according to an aspect of the present invention that can be used in the bipolar plate assembly of FIG. 3.

Referring to FIG. 4 in conjunction with FIG. 3, as with the subgaskets 75 discussed above, one or more metal beads 105 provide an upstanding wall or berm that extends from the surface of the bipolar plate 65 that includes plateaued planar engaging portion 107 for engagement with either subgasket 75 or a comparable metal bead 105 on an adjacently placed plate 65. In one preferred embodiment, metal bead 105 is between about 300 μm and 600 μm in thickness, and between about 1 mm and 4 mm in width. A microseal 110 (as well as its variants 110A and 110B) form a thin relatively compliant layer that is formed on the planar engaging portion 107 of the metal bead 105 between adjacent bipolar plates 65, or between a plate 65 and gasket 75. In a preferred form, the layer formed by the microseal 110 has a thickness of between about 30 and 300 μm, while a preferred width across the engaging portion 107 is between about 1 mm and 3 mm. Together, the gasket-like structure of the metal bead 105 and the microseal 110 define a metal bead seal (MBS) 115. The gasket-like nature of the metal bead 105 arises out of it being shaped as an upstanding rectangular, trapezoidal (as shown) or slightly curved projection that is formed by stamping from the thin metal material that makes up the respective plates 65A, 65B. The top surface defines an engaging portion 107 that is generally similar in construction and function to the lands 72 that may also be integrally formed within one or both of the plates 65A, 65B. As such, the engaging portion 107 corresponds to the region of the metal bead 105 that is designed to be placed into facing contact with the microseal 110, subgasket 75, MEA 50 or adjacent metal bead 105. Significantly, the microseal 110 functions to (a) fill in the surface imperfections of the metal bead 105 or subgasket 75 in the engaging portion 107, (b) induce a more uniform seal force per length along the metal bead 105 length by providing a compliant cushion to make up the non-uniform compressed height of the metal bead 105, (c) prevent fluid (such as reactant) permeation through its bulk and (d) prevent leakage through the interface formed between either (i) the subgasket 75 and microseal 110 or (ii) metal bead 105 and microseal 110, depending on the precise engagement during stack 1 formation. The elastomeric microseal 110 is shown attached to the engaging portion 107, although it will be appreciated by those skilled in the art that the microseal 110 may also be formed onto the surfaces of the subgaskets 75 as well as (or instead of) directly on the metal bead 105; all such variants are deemed to be within the scope of the present invention, as are variants where the microseal 110 is directly mounted to the plate 65A, 65B or other structure.

Regardless of whether each half-plate 65A, 65B is configured to convey reactant, coolant or both, and further regardless of whether such fluids are being conveyed through the half-plate 65A, 65B active area 80 or manifold area 85, seal 110 placed on the engaging surface 107 is such that when multiple cells 30 are aligned, stacked and compressed into a housing 5 to make up stack 1, the seals 110 are deformably compressed to enhance the sealing between the adjacent half-plates 65A, 65B. Although not shown in FIG. 4 as being hidden behind subgasket 75, an MEA 50 (such as that depicted in FIG. 2) is sandwiched between adjacent half-plates 65A, 65B such that the three components resemble cell 30. As mentioned above, the cooperation of the metal bead 105 and seal 110 on each of joined half-plates 65A, 65B defines the MBS 115 that promotes a more robust, leakage-free sealing, regardless of whether such sealing is formed in the active area 80 or manifold area 85. In another version (not shown), the seal 110 can be attached or directly formed onto the subgasket 75 as part or extension of the MEA 50; either variant is deemed to be within the scope of the present invention.

The material used to form the seal 110 is made from a composition containing a resilient plastic or elastomer (including polyacrylate, alhydrated chlorosulphonated polyethylene, ethylene acrylic, chloroprene, chlorosulphonated polyethylene, ethylene propylene, ethylene vinyl acetate, perfluoroelastomer, fluorocarbon, fluorosilicone, hydrogenated nitrile, polyisoprene, microcellular polyurethane, nitrile rubber, natural rubber, polyurethane, styrene-butadiene rubber, TFE/propylene, silicone, carboxylated nitrile or the like). The present inventors have determined that the use of silicone-based materials is attractive due to the range of viscosities of the precursor resins coupled with their overall durability and toughness once cured. They have likewise determined that hardness when cured or compliance of the cured film, as well as the insensitivity to temperature across the expected operating temperatures of the fuel cell vehicle, are also desirable attributes of silicone-based systems. As will be discussed in more detail below, the present inventors have found ways to customize these materials with additional components to give them extended operating lives and rapid cure times with elevated temperatures, as well as very strong bonding properties once the plates 65 have been aligned, stacked and compressed into the stack housing.

In one form, the primary material component includes an α,ω-terminated vinyl polydimethylsiloxane (PDMS):

while a variant (methylhydrosiloxane (H301 PDMS, also referred to as hydrosiloxane)) of the above in the form of:

may be used, while the platinum-based catalyst (such as Karstedt's catalyst) that can be a curing agent component is in the form of:

and the inhibitor component to control cure kinetics (e.g., phenylacetylene) is:

and where the adhesion promoter component—1,2 bis(triethoxysilyl) ethane (BTSE)—is:

The BTSE is a dipodal form in that it has two Si atoms with three of the ethoxy or methoxy side groups. Other alternative materials may include 1,2 bis(methyldiethoxysilyl) ethane, 1,4 bis(triethoxysilyl) benzene, bis(triethoxysilyl) ethane, bis(triethoxysilyl) methane, 1,8 bis(triethoxysilyl) octane, 1,2 bis(trimethoxysilyl) ethane, bis(trimethoxysilylethyl) benzene, 1,6 bis(trimethoxysilyl) hexane, 1,4 bis(trimethoxysilylmethyl) benzene, 1,3 bis(trimethoxysilylpropyl) benzene, 1-(triethoxysilyl)-2-(diethoxymethylsilyl) ethane, as well as variants of any of the above that also contain a reactive vinyl or hydrosilane group for the purpose of bonding into the curing silicone network. Of these, the bis(triethoxysilyl) ethane appears to most closely mimic the delayed formation of the strong adhesive bond produced by the BTSE discussed above.

It is preferred to mix the components making up the precursor materials (i.e., those materials in their raw, uncured condition) prior to using the screen printing process discussed above. In one form, such mixing (on larger industrial scales) may be initiated by using a Cowles blade or high speed dispersion disk, so long as the high surface area reinforcing silica is dispersed into the resin as homogeneously as possible to ensure optimum final properties. The primary ingredients used to make the precursor include at least (a) a silicone-based precursor, (b) a catalyst, (c) an inhibitor to control cure kinetics and (d) a delayed (i.e., latent) adhesion promoter. Moreover, the precursors are divided into two parts (referred to herein as Part A and Part B), each of which may have some of the components discussed above in common. For example, for Part A, a vinyl-terminated PDMS with varying molecular weights may be combined, where a portion of the combination will be used in both Parts A and B. In such case, a preferred range for the equivalent weight would be somewhere between about 7,000 and about 35,000. More particularly, a first vinyl-terminated PDMS may have a molecular weight of about 155,000, while a second vinyl-terminated PDMS has a molecular weight of about 6000. Moreover, a ratio between these first and second ingredients may be made to be roughly 4:1 and even more preferably 4.2 to 1 for an average molecular weight per reactive vinyl group (or equivalent weight) of about 13,275; such equivalent weights are correlated to the average density between crosslinks, as well as to the network stiffness. In another form, the ratio of higher and lower molecular weight ingredients in Part B could range from between about 8:1 to 2:1, or in another form between about 20% to about 50% of the higher molecular weight ingredient and about 3% to about 20% for the lower molecular weight ingredient. A portion of part A is mixed with about 4% by weight catalyst-containing material (which in one form includes platinum in an amount of about 5 to 10 parts per million in the final formulation) under high rotational conditions for a brief amount of time to dissolve the catalyst. Any leftover catalyst should be mixed in and added to Part A as well. In addition, the vinyl terminated silicone for Part A and B is mixed and added to containers holding both cups. A hydrosiloxane may be added to Part B which is then mixed under time and rotational conditions similar to those for the catalyst. The present inventors have found that the choice of catalyst was found to be one in a neat vinyl siloxane solution as opposed to dilution in xylenes, as this demonstrated improved properties in both cure kinetics as well as a lowering degree of thickening seen in Part A in the first 24 to 48 hours after preparation. Likewise, while both 2-pentyne and phenylacetylene performed comparably in terms of a desirable cure profile, the latter was deemed preferable for the manufacturing parameters of interest, as costs were lower, while objectionable odors were significantly reduced at the same 0.1-1.0% loading level of interest.

In one preferred form, a fifth ingredient in the form of a reinforcement material (such as a silica-containing material) is used to improve the mechanical properties of the seal. In such case, the silica is added through the use of a dispersion disk as discussed above or any other manner known to those skilled in the art.

For Part B, a small amount of liquid inhibitor (such as phenylacetylene in an amount of about 0.1% by weight) is added and mixed to control cure kinetics. Details of such inhibitors may be found in U.S. Pat. No. 3,445,420 entitled ACETYLENIC INHIBITED PLATINUM CATALYZED ORGANOPOLYSILOXANE COMPOSITIONS the contents of which are incorporated by reference herein. After this, about 1% by weight adhesion promoter is added to Part B and further mixed. Subsequently, both samples are preferably degassed until such time as foaming visibly stops.

Significantly, the present inventors have found that conventional silane adhesion promoters (such as allyltrimethoxysilane (ATMS) and allyltriethoxysilane (ATES), both of which have a single Si atom with corresponding three methoxy or ethoxy side groups) promoted aggressive and prompt bonding to surface coatings that would be placed directly on the stainless steel surface that makes up bipolar plates 65, as well as those plates 65 that were coated with a thin physical vapor deposition (PVD) carbon or ceramic-based layer. In one study conducted by the inventors, ATMS was found to bond tenaciously after about 15 minutes at 80°

C. of cure time, and that such conditions led to a condition where a 20 mil thick film was not able to be peeled from the coating surface without destroying the film. The present inventors have determined that this prompt adhesion formation is undesirable when applied to fuel cell bipolar plates 65, as it provides too short of a time window for the subsequent stack formation operations.

When the present inventors used 1, 2 bis(triethoxysilyl) ethane instead of ATMS, they discovered that a latent adhesion formation was achieved; as such, while a substantially full cure took place at 80° C. for 3 minutes, the 20 mil thick films could still be peeled off the coating surface with an adhesion force that is comparable to cellophane-based adhesive tape (i.e., about 1-2 N/cm). Following a temperature exposure at 55° C. and roughly 90% relative humidity for about 72 hours (which was used to simulate the break-in period and subsequent initial operation of fuel cell stack 1), tenacious adhesion was achieved where the film again could not be peeled from the surface without tearing and significant damage. As such, by using BTSE, the inventors found that they could achieve the same high level of long-term adhesive bonding, but that such bonding levels could be delayed long enough to allow subsequent stack 1 fabrication steps to be completed. Moreover, the present inventors found that the differences in bonding aggressiveness between ATES and ATMS on one hand and BTSE on the other is surprising given that they have the same ethoxy reactive groups. Thus, despite the fact that these similar ethoxy reactive groups would be expected to provide similar adhesion kinetics, the fact that BTSE performed with the latent adhesion properties in the manner discussed herein led the present inventors to use it as an adhesion promoter rather than those mentioned above.

Figure 5:
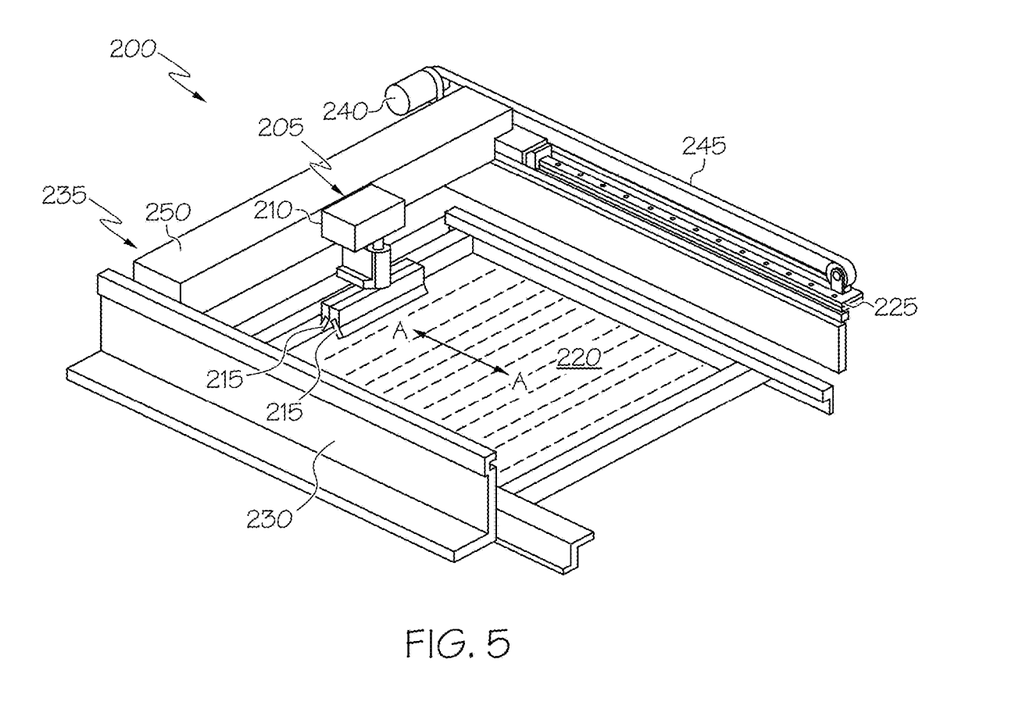
FIG. 5 is graph showing a notional screen printing process that may be used to place a seal on the bipolar plate of FIG. 3.

Referring next to FIG. 5, in one preferred form, the composition making up the seal 110 is applied by a screen printing process where a screen printer 200 with a print head assembly 205 is outfitted with a fluid material dispenser 210 and a doctor blade, roller or squeegee (only the latter of which is shown) 215 that is passed over a woven mesh screen 220 with a print head assembly 215 masking (not shown) that is secured by a suitably configured support frame 230; the blade, roller or squeegee 215 forces the selective passage of the seal precursor materials through openings in the screen 220 and onto the metal bead substrate (not presently shown) once the blade, roller or squeegee 215 is moved across the screen 220. Screen printing is advantageous because of its scalability, low cost and ability to print on discrete substrates such as the bipolar plates 65 discussed herein. Especially beneficial is its ability to permit a sufficiently thick layer (for example, between about 30 and 150 μm) of seal precursor material to give the seal 110 appreciable raised (i.e., 3-D) attributes. Moreover, such thickness can be attained without having to make multiple passes, thereby further enhancing its ability to be used for large-scale manufacturing. Moreover, screen printer 200 is compatible with precursors that include adhesives, particularly the ones that exhibit latent adhesive properties such as those disclosed herein. To facilitate movement of the print head assembly 205, a pair of spaced, parallel linear bearings 225 are mounted to a support frame 230 at opposite sides of the printing screen 210. A print carriage 235 proceeds along the bearings 225 under the cooperative action of a drive motor 240 and tooth belts 245, while a gantry 250 permits lateral back-and-forth movement of the print head assembly 205 to facilitate complete surface coverage of the screen 220 and underlying substrate. In one form, the squeegees 215 may be independently movable along a vertical axis in order to perform screen printing operations along both directions of the printing axis A. In this way, a downward force is maintained on one of the squeegees 215 during each back-and-forth movement along axis A. The seal precursor material is deposited from the print head assembly 205 upstream of the squeegees 215 such that the squeegees 215 may spread the seal precursor material across the screen 220 and through both the screen 220 and apertures formed in the mask (not shown) onto the substrate below. Additional screen printing features unique to the formation of seals are disclosed in an exemplary form in U.S. Pat. No. 4,919,969 to Walker entitled METHOD OF MANUFACTURING A SEAL, the contents of which are incorporated by reference in their entirety herein.

Figure 6:
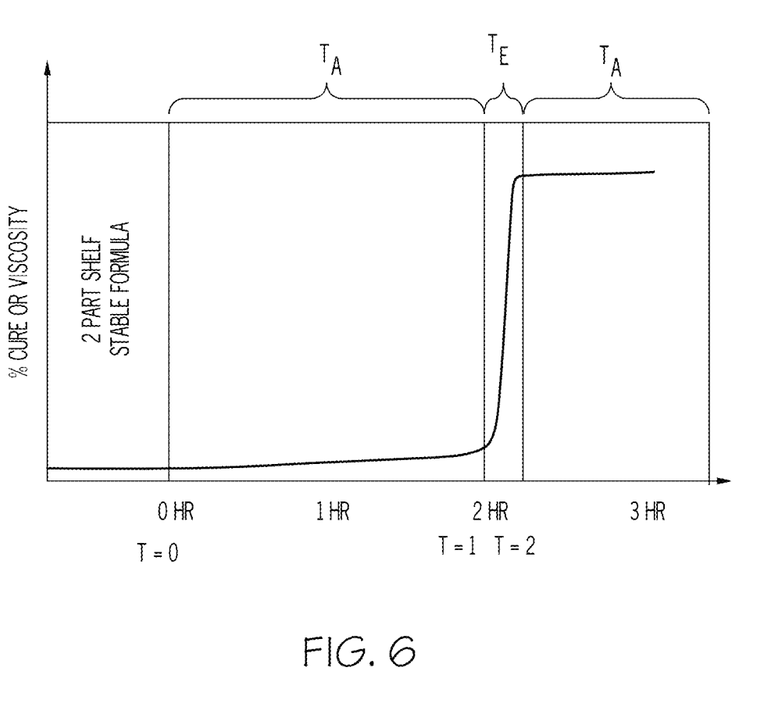
FIG. 6 shows one curing and adhesion-forming profile to form a seal using the composition according to an aspect of the present invention.

Referring next to FIG. 6, a preferred profile for having the composition applied to a metal bead or related fuel cell substrate is shown. Hitherto time t=0, the Parts A and B as discussed above have been kept separate so that they remain stable in an uncured state, which is advantageous in providing a significantly long shelf-life. At time t=0, Parts A and B are mixed, at which time the curing of the liquid resin commences in a relatively slow process under substantially ambient temperature conditions $T_A$ (for example, between about 20° C. and 30° C.); during this time, the liquid resin precursor may be deposited on the target substrate (such as by the aforementioned screen printer 200). In a preferred form, there would be ample time (for example, about 2 hours) between the time of mixing and the precursor deposition process. Once deposited onto its desired location (such as on top of the metal beads 105), the composition that makes up the precursor is exposed to an elevated temperature condition $T_E$ (for example, in an oven, autoclave or related device) at time t=1. In one form, such elevated temperature $T_E$ is between the ambient temperature $T_A$ and about 80° C. such that the viscosity increase that corresponds to the curing builds in a stable way over a relative short time period (for example, about 15 minutes). Once this curing is substantially complete (which may be indicated for example by the viscosity curve flattening out) at time t=2, the seal 110 that forms on the metal bead 105 and the rest of the bipolar plate 65 (all as shown in FIG. 4) may be returned to ambient temperature $T_A$ conditions so that suitable alignment, compression and related stack 1 formation steps may be undertaken.

The resins that make up the precursors are specifically designed to perform in a manufacturing environment where a two-part silicone resin is applied to a screen printing process where the precursor is transferred onto a plate using a mask with the desired metal bead shape. As such, the composition discussed herein may be a custom-tailored silicone resin formulation designed to meet cure profiles optimized for maximum fuel cell manufacturing efficiency. In particular, by delaying the interfacial bond formation between the composition making up the seal 110 and the metal bead 105, subgasket 75 or other substrate until after assembly and compression of the overall fuel cell stack 1, significant reductions in interfacial stress can be realized, as the Poisson effect that would ordinarily occur in an already-adhered seal are reduced because the composition making up the seal hasn't had time to form the strong bond that would limit the seal freedom of movement. This criteria is significant, in that given the thin nature of a typical fuel cell metal bead (where the height or thickness is preferably no more than about 300 μm) combined with relatively large cross-sectional widths (for example, about 2 millimeters), results in low aspect ratio surfaces that could be expected to introduce fairly sizable amounts of lateral Poisson stresses to the seals 110 when subjected to the high axial loads typically imparted to the plates 65 along their stacking dimension during stack compression. The present inventors have found that such untrammeled Poisson stresses will contribute to premature seal failure, as well as significant degradations of stack performance.

As such, the required material must demonstrate significant shelf stability as discussed above (for example, at least a few months), followed by a low viscosity build upon mixing of the two Parts A and B at ambient temperature $T_A$. Over the course of post-mix handling of the liquid resin (i.e., roughly 2 hours as shown above), the resin should show minimal change in viscosity or extrusion properties at such ambient temperature $T_A$; this period of slow viscosity change is beneficial in situations where delays may be present, such as if there is a required dwell time before application or a manufacturing line delay. This best ensures a consistent volume or mass dispensed for a given applied pressure. Upon screen printing, the material is moved into an oven region where it is exposed to the elevated temperature $T_A$ mentioned above. During this period the material must cure to near completion after which it will be consolidated with other plates and assembled into the full fuel cell stack 1. During this same cure time, some amount of adhesive bond can be expected to form at the plate-to-plate interfaces (which preferably take place at the facingly adjacent metal beads 105). Of course, as discussed herein, the majority of the development of the adhesive strength is preferably delayed until the stack 1 is assembled and compressed to allow the bond at the interface to relax and relieve stress upon the plate 65 compression. In one preferred form, at least a majority of the adhesive bond formation is delayed until after plate 65 compression and consequent stack 1 formation is complete. While the present inventors did not quantify the amount of prompt adhesive bond formation, they did perform qualitative assessments to confirm that the deposited material could be removed by hand similar to the pressure sensitive adhesives discussed above, and that such removal took place without damaging the integrity of the seal 110. From this, they inferred that the strength of the interfacial bond in this first phase is much less than the tensile strength of the seal 110. By contrast, once the adhesive bond was fully established once the various plates 65 were stacked, aligned and compressed, it became much more difficult to pull the seal 110 off without destroying it; because the peel force exceeded the tensile strength of the material (which was measured at about 3.5 MPa or 350 N/cm$^2$), and the sample strips used by the inventors were ½ of an inch wide and 20 mils thick, the present inventors determined that a roughly eleven-fold increase in force was required to break the strips between the early stage to the final bonded stage. As such, in one measure, the present inventors believe that only 10% or less of the adhesive bond strength is set up in the early (i.e., curing) stage.

The ability to formulate a mixture capable of meeting the viscosity, ambient stability, and cure profile requirements described above balances multiple competing properties. For example, in order to successfully dispense the liquid resin precursor for a screen printing application, the resin must possess sufficient viscosity to avoid slump and flow when applied to the squeegee 215 yet be able to adequately shear in a relatively thin way such that it can be transferred to the bipolar plate 65 under the rapid motion of the squeegee 215 across the screen 220 and mask. Aspects of the manufacturing environment—including the desire to print large number of plates 65 with a single quantity of resin or temporary stoppage of the manufacturing line (less than about 2 hours)—require that the resin possess limited rheological change at ambient temperature over such a time period. However, once the liquid resin precursor has been transferred, it is important that it be cured in the shortest time possible (preferably less than about 15 minutes) and at or below temperatures that could cause damage to the seal 110 or underlying substrate (where, in the case of a subgasket 75, may be made from a relatively low-temperature material). The formulations described here show the ability to maintain the initial rheological properties after combining parts A and B for a long enough time and with adequate viscosity to avoid slump or flow when placed on the screen printing blade or squeegee 215.

Considerable effort was put forward in optimizing a silicone resin that would possess mechanical properties comparable to commercial systems, but that would also have the improved cure profiles and viscosities discussed herein. When applying such materials in the form of a seal 110 to a fuel cell bipolar plate 65, the curable resin preferably has a thickness between 4 mils and 40 mils, with a preferred range of about 10 to 30 mils. Comparable cure temperatures are preferably below about 150° C., and more preferably below about 140° C., and more preferably below about 130° C., and more preferably below about 120° C., and more preferably below about 110° C., and more preferably below about 100° C., and more preferably below about 90° C., and more preferably below about 80° C., and more preferably below about 70° C., and more preferably below about 60° C., and more preferably below about 50° C., and more preferably below about 40° C.; it being understood that the choice between these preferred cure temperatures may be dictated by other processing parameters, such as the sensitivity of other soft materials (for example, the MEA 50) to such temperatures. Likewise, in configurations where the seal 110 might be cured before other such temperature sensitive materials are placed, other (i.e., higher) temperatures could be employed. Likewise, the compressive stress applied to the stacking, aligned fuel cells is relatively high (for example, above 1 MPa).

Although not shown, one particular application for a system based on a stack 1 of PEM fuel cells 30 could be an automobile or related vehicle. Within the present context, it will be appreciated that the term "vehicle" may apply to car, truck, van, sport utility vehicle (SUV) or other such automotive forms such as buses, aircraft, watercraft, spacecraft and motorcycles; all are deemed to be made cooperative with the present invention for the purposes of generating propulsive or motive power.

It is noted that terms like "preferably", "generally" and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention. Likewise, the terms "substantially" and "approximately" and their variants are utilized herein to represent the inherent degree of uncertainty that may be attributed to any quantitative comparison, value, measurement or other representation. As discussed above with particularity to ways to ensure that no more than weak, temporary forms of adhesion are used between adjacent microseals 110 and their associated substrates, the term "substantially" when used to modify the assembly of the fuel cell stack 1 is utilized herein to represent that some of these temporary or residual adhesive means may be used herein without resulting in a change in the basic function of the subject matter at issue; as such, by including some of these weaker, more temporary ways to hold the various stack 1 components in place during assembly do not detract from the fact that the significant (i.e., more permanent) form of adhesion is not used until such time as the various stacked cells have been aligned, pressed together and secured within the stack 1.

Having described the invention in detail and by reference to specific embodiments, it will nonetheless be apparent that modifications and variations are possible without departing from the scope of the invention defined in the appended claims. In particular it is contemplated that the scope of the present invention is not necessarily limited to stated preferred aspects and exemplified embodiments, but should be governed by the appended claims.

We claim:

1. A method of sealing a plurality of fuel cell components, the method comprising:
   depositing an adhesive composition on a surface of each of the plurality of fuel cell components, the adhesive composition including precursor parts;
   thermally curing the adhesive composition for a first time period such that a seal is formed thereby;
   aligning, after thermally curing, the plurality of fuel cell components along a stacking axis to thereby produce aligned components;
   compressing the aligned components along the stacking axis such that the seal defines an interface between adjacently facing ones of the aligned components; and
   forming at least a majority of an adhesive interfacial bond between the adjacently facing ones of the aligned components only after the aligning and the compressing.

2. The method of claim 1, wherein the adhesive composition includes:
   a silicone-based component,
   a platinum-based catalyst component,
   a silica-based structural reinforcement component,
   an inhibitor component for controlling cure kinetics, and
   a latent adhesion promoter.

3. The method of claim 2, wherein the latent adhesion promoter is selected from the group consisting of 1,2 bis(triethoxysilyl) ethane, 1,2 bis(methyldiethoxysilyl) ethane, 1,4 bis(triethoxysilyl) benzene, bis(triethoxysilyl) methane, 1,8 bis(triethoxysilyl) octane, 1,2 bis(trimethoxysilyl) ethane, bis(trimethoxysilylethyl) benzene, 1,6 bis(trimethoxysilyl) hexane, 1,4 bis(trimethoxysilylmethyl) benzene, 1,3 bis(trimethoxysilylpropyl) benzene and 1-(triethoxysilyl)-2-(diethoxymethylsilyl) ethane and the silicone-based component includes a vinyl-based siloxane.

4. The method of claim 3, wherein the fuel cell components include bipolar plates with metal beads formed thereon that are sized such that a substantial entirety of the depositing takes place on an engaging surface defined on each of the metal beads.

5. The method of claim 3, the depositing is selected from the group consisting of screen printing, silk screening and masked spray coating.

6. The method of claim 3, wherein the first time period is no more than about 15 minutes.

7. The method of claim 3, wherein the depositing takes place within about 2 hours of the first time period.

8. The method of claim 3, wherein the precursor parts include a first part and a second part, the first part including vinyl polydimethylsiloxane, the silica-based structural reinforcement component and the platinum-based catalyst, the second part including vinyl polydimethylsiloxane, the silica-based structural reinforcement component, methylhydrosiloxane, the inhibitor component and the latent adhesion promoter.

9. The method of claim 2, wherein the latent adhesion promoter comprises a dipodal silane.

10. The method of claim 2, wherein the silicone-based component comprises vinyl polydimethylsiloxane.

11. The method of claim 10, wherein the silicone-based component further comprises methylhydrosiloxane.

12. The method of claim 2, wherein the platinum-based catalyst component comprises a Karstedt's Catalyst.

13. The method of claim 2, wherein the inhibitor component is selected from the group consisting of 2-pentyne, 4-methyl-1-pentyn-4-ol, 2-butyne, isopropenylacethylene, phenylacetylene, an alcoholysis product of 4-methyl-1-pentyn-4-ol and trimethylethoxysilane, and $C_8H_5Si(OCH_3C\equiv CH)_3$.

14. The method of claim 2, wherein the silica-based structural reinforcement component includes fumed silica.

15. The method of claim 1, wherein the precursor parts include a first part and a second part, the first part including a vinyl-based siloxane, a silica-based structural reinforcement, and a hydrosilation-based catalyst, the second part including a vinyl-based siloxane, a silica-based structural reinforcement, methylhydrosiloxane, an inhibitor component, and 1,2 bis(triethoxysilyl) ethane.

16. The method of claim 15, wherein the vinyl-based siloxane of the first part includes approximately 35 percent by weight on a basis of weight of the first part vinyl terminated polydimethylsiloxane with a first molecular weight and approximately 8 percent by weight on a basis of weight of the first part vinyl terminated polydimethylsiloxane with a second molecular weight such that an equivalent molecular weight is between about 7,000 and about 35,000.

17. The method of claim 16, wherein a ratio of the vinyl-based siloxane of the second part with the first molecular weight to the vinyl-based siloxane of the second part with the second molecular weight is approximately 4:1.

* * * * *